United States Patent
Fujita et al.

(10) Patent No.: US 9,016,917 B2
(45) Date of Patent: Apr. 28, 2015

(54) ELECTRONIC DEVICE AND ASSEMBLY METHOD OF THE SAME

(71) Applicant: Fujitsu Limited, Kawasaki-shi, Kanagawa (JP)

(72) Inventors: Kyoko Fujita, Kato (JP); Jun Hata, Nishinomiya (JP); Kei Kojima, Kawasaki (JP); Chikara Kobayashi, Kato (JP)

(73) Assignee: Fujitsu Limited, Kawasaki (JP)

( * ) Notice: Subject to any disclaimer, the term of this patent is extended or adjusted under 35 U.S.C. 154(b) by 59 days.

(21) Appl. No.: 13/863,953

(22) Filed: Apr. 16, 2013

(65) Prior Publication Data

US 2013/0329419 A1 Dec. 12, 2013

(30) Foreign Application Priority Data

Jun. 11, 2012 (JP) .................................. 2012-132250

(51) Int. Cl.
*F21V 8/00* (2006.01)
*H04M 1/22* (2006.01)
*H04M 1/02* (2006.01)
*H04M 1/03* (2006.01)

(52) U.S. Cl.
CPC ............... *G02B 6/0076* (2013.01); *H04M 1/22* (2013.01); *H04M 1/026* (2013.01); *H04M 1/03* (2013.01); *H04M 2250/12* (2013.01)

(58) Field of Classification Search
CPC .................... F21V 2008/006; F21V 2008/008; F21V 11/10; F21V 11/14
USPC ........ 362/581, 602, 553, 259, 616, 551, 23.1; 340/815.5, 815.75
See application file for complete search history.

(56) References Cited

U.S. PATENT DOCUMENTS

| | | | | |
|---|---|---|---|---|
| 6,302,570 B1 * | 10/2001 | Petell et al. | ................... | 362/554 |
| 6,847,306 B2 * | 1/2005 | Diba et al. | ................... | 340/906 |
| 7,352,930 B2 * | 4/2008 | Lowles | ........................ | 385/31 |
| 7,926,964 B2 * | 4/2011 | Claprood | ...................... | 362/26 |
| 8,172,425 B2 * | 5/2012 | Wen et al. | ................ | 362/249.02 |

(Continued)

FOREIGN PATENT DOCUMENTS

EP 1253447 A2 10/2002
JP 2011-068123 A 4/2011

OTHER PUBLICATIONS

Extended European Search Report dated Nov. 14, 2013, issued in corresponding European Patent Application No. 13164164.9.

*Primary Examiner* — Anh Mai
*Assistant Examiner* — Matthew J Peerce
(74) *Attorney, Agent, or Firm* — Westerman, Hattori, Daniels & Adrian, LLP

(57) ABSTRACT

An electronic device includes a housing, a first light guide plate, a second light guide plate, and a first adhesive member. A first hole in position to a first light-emitting source and a second hole in position to a second light-emitting source are formed on the housing. The first light guide plate has a first projection to be inserted into the first hole. The second light guide plate has a main-body plate portion to be superposed on the first light guide plate with the first projection penetrating therethrough and a second projection to be inserted into the second hole. The second light guide plate blocks out the light of the first light-emitting source with the main-body plate portion. The first adhesive member is inserted between the second light guide plate and the housing, and attaches the main-body plate portion to the housing.

6 Claims, 7 Drawing Sheets

(56) References Cited

U.S. PATENT DOCUMENTS

| | | | |
|---|---|---|---|
| 8,317,382 B2 * | 11/2012 | Smith | 362/555 |
| 2006/0126320 A1 * | 6/2006 | Fong et al. | 362/27 |
| 2007/0019433 A1 | 1/2007 | Lowles | |
| 2008/0143560 A1 * | 6/2008 | Shipman | 341/22 |
| 2010/0020528 A1 * | 1/2010 | Feit | 362/30 |
| 2011/0280037 A1 * | 11/2011 | Cho et al. | 362/553 |
| 2011/0317415 A1 * | 12/2011 | Yamanaka | 362/235 |
| 2012/0051081 A1 | 3/2012 | Liu | |
| 2013/0016522 A1 * | 1/2013 | Baek et al. | 362/602 |
| 2013/0044509 A1 * | 2/2013 | Chung et al. | 362/602 |
| 2013/0050584 A1 * | 2/2013 | Kaihotsu | 348/731 |
| 2013/0083556 A1 * | 4/2013 | Huang | 362/602 |

* cited by examiner

ELECTRONIC DEVICE AND ASSEMBLY METHOD OF THE SAME

CROSS-REFERENCE TO RELATED APPLICATION

This application is based upon and claims the benefit of priority of the prior Japanese Patent Application No. 2012-132250, filed on Jun. 11, 2012, the entire contents of which are incorporated herein by reference.

FIELD

The embodiment discussed herein is directed to an electronic device and an assembly method of the electronic device.

BACKGROUND

In recent years, electronic devices equipped with multiple light-emitting sources, such as a light-emitting diode (LED) for incoming call and an infrared sensor, have become popular. The electronic devices equipped with multiple light-emitting sources include, for example, a cellular phone (a smartphone), a tablet personal computer (PC), and the like.

More specifically, such an electronic device includes a housing on which a first hole corresponding in position to an LED and a second hole corresponding in position to an infrared sensor are formed. The electronic device further includes an LED light guide plate that has a first projection to be inserted into the first hole of the housing and guides light of the LED from the first projection to the first hole. The electronic device still further includes an infrared-sensor light guide plate that has a second projection to be inserted into the second hole of the housing and guides light of the infrared sensor from the second projection to the second hole.

A double-sided tape is inserted between the LED light guide plate and the housing to fix the LED light guide plate to the housing and prevent intrusion of water or the like into the housing. Furthermore, a double-sided tape is inserted between the infrared-sensor light guide plate and the housing to fix the infrared-sensor light guide plate to the housing and prevent intrusion of water or the like into the housing. Namely, the LED light guide plate and the infrared-sensor light guide plate are attached to the housing via the separate double-sided tapes, respectively.

Patent document 1: Japanese Laid-open Patent Publication No. 2011-068123

However, the conventional structure is not designed to maintain the light blocking effect while securing an attachment region of an adhesive member inserted between a light guide plate and a housing.

Namely, with the miniaturization of recent housings, it is often the case that an LED light guide plate and an infrared sensor are proximally placed. Therefore, in the conventional structure where the LED light guide plate and the infrared-sensor light guide plate are attached to the housing via the separate double-sided tapes, an attachment region of each of the double-sided tapes becomes narrower with the miniaturization of the housing. As a result, it may become difficult to secure respective attachment regions of the double-sided tapes inserted between the light guide plates and the housing.

If an attachment region of the double-sided tape is excessively narrow, the double-sided tape is likely to come off from, for example, the LED light guide plate or the housing, and thus light of the LED could come out through a gap between the double-sided tape and the LED light guide plate or the housing. Consequently, the light blocking effect may be deteriorated.

SUMMARY

According to an aspect of an embodiment, an electronic device includes a housing on which a first hole corresponding in position to a first light-emitting source and a second hole corresponding in position to a second light-emitting source are formed; a first light guide plate that has a first projection to be inserted into the first hole and guides light of the first light-emitting source from the first projection to the first hole; a second light guide plate that has a main-body plate portion to be superposed on the first light guide plate with the first projection penetrating therethrough and a second projection to be inserted into the second hole, and blocks out the light of the first light-emitting source with the main-body plate portion and guides light of the second light-emitting source from the second projection to the second hole; and a first adhesive member that is inserted between the second light guide plate and the housing and attaches the main-body plate portion to the housing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiment of the present invention will be explained with reference to accompanying drawings. Incidentally, the present invention is not limited to the embodiment. For example, in the embodiment described below, a cellular phone (a smartphone) is taken as an example of the electronic device; however, the electronic device is not limited to this.

Figure 1:
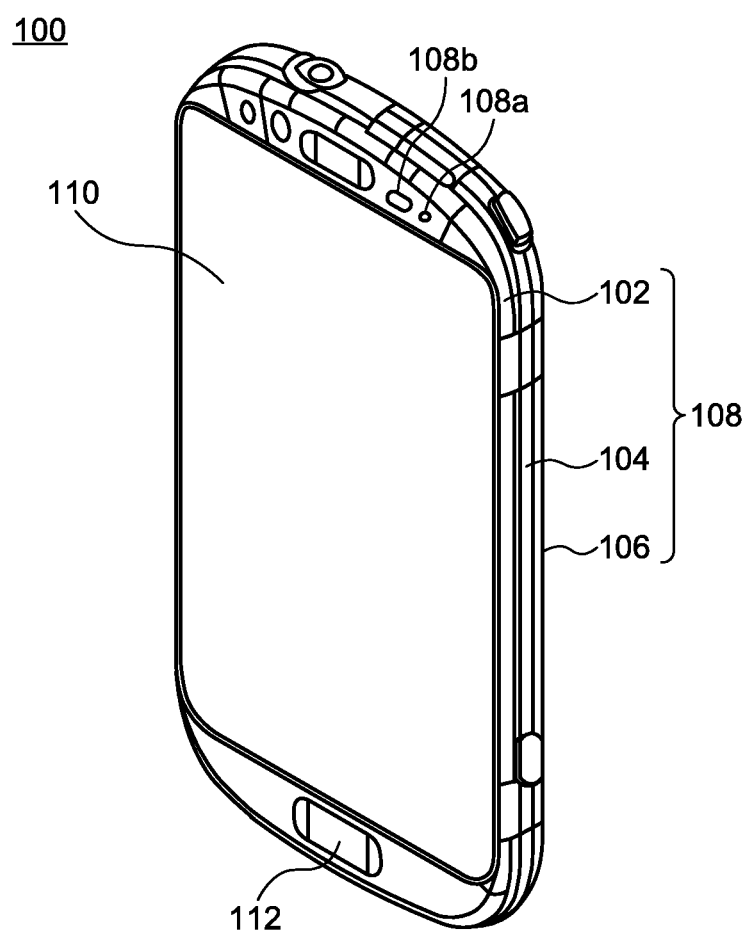
FIG. 1 is a perspective view illustrating the appearance of a cellular phone according to a present embodiment.
Figure 2:
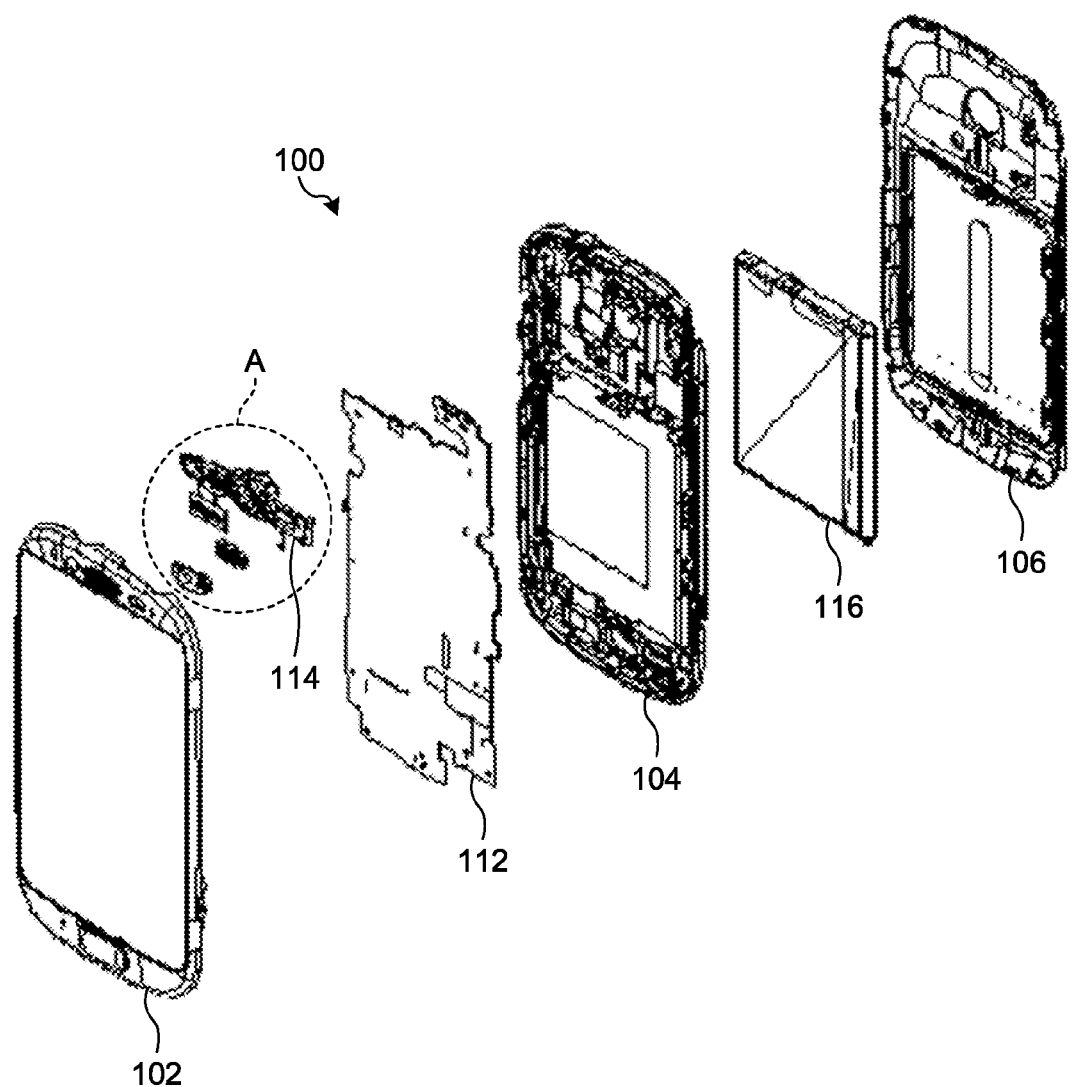
FIG. 2 is an exploded perspective view of the cellular phone according to the present embodiment.
Figure 3:
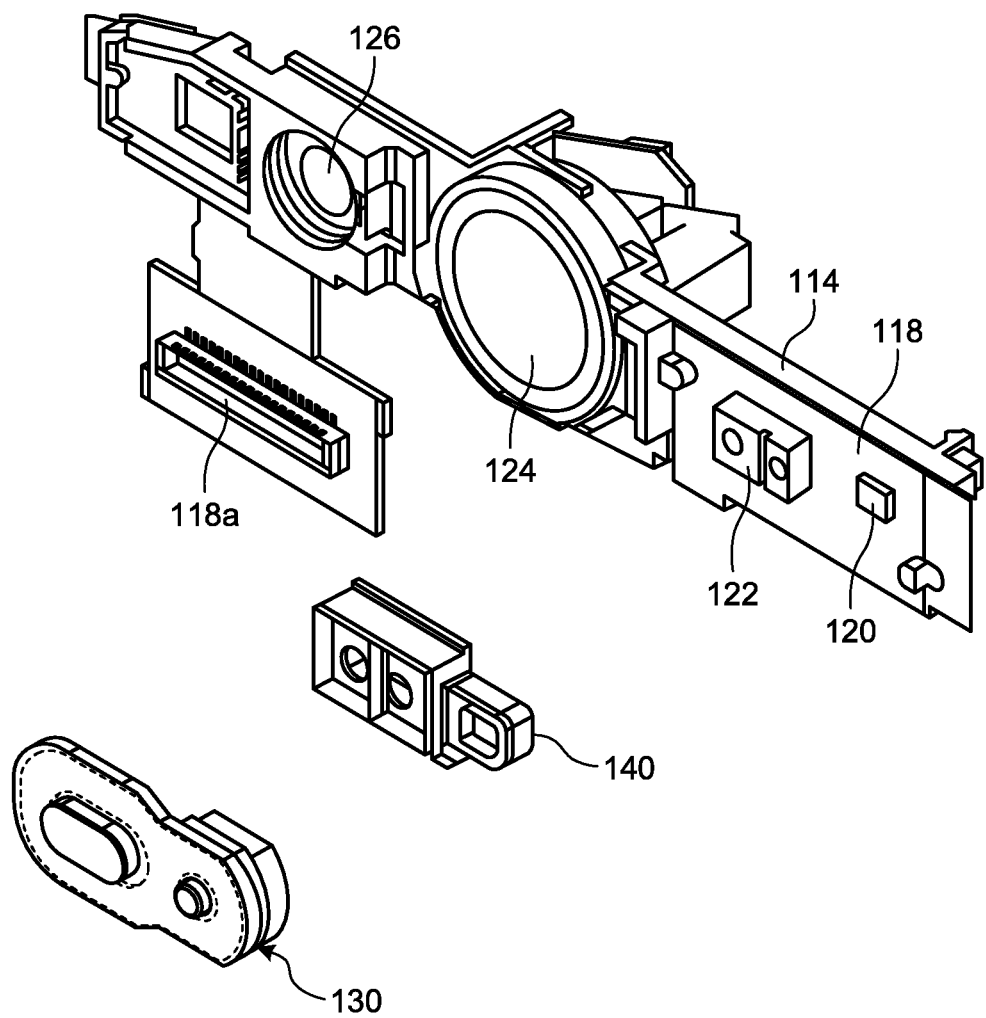
FIG. 3 is an enlarged perspective view of a portion A illustrated in FIG. 2.

FIG. 1 is a perspective view illustrating the appearance of a cellular phone according to a present embodiment. FIG. 2 is an exploded perspective view of the cellular phone according to the present embodiment. FIG. 3 is an enlarged perspective view of a portion A illustrated in FIG. 2. As illustrated in FIGS. 1 to 3, a cellular phone 100 according to the present embodiment includes a housing 108 whose one side is open;

the housing 108 is formed by a combination of a front case 102, a rear case 104, and a rear cover 106.

The front case 102 is formed into, for example, a frame-like shape. In an opening of the housing 108 formed by the front case 102, a plate-like touch panel 110 is placed so as to fit into the open side of the housing 108. At the upper part of the housing 108 above the touch panel 110, a first hole 108a corresponding in position to a light-emitting diode (LED) 120 to be described later and a second hole 108b corresponding in position to an infrared sensor 122 to be described later are formed.

The rear case 104 is formed into, for example, a frame-like shape corresponding to the front case 102, and is combined with the front case 102. In an internal space of the housing 108 formed by combining the front case 102 and the rear case 104, a circuit board 112 fixed to the rear case 104 and a parts holder 114 fixed to the circuit board 112, etc. are housed.

The rear cover 106 is formed so as to cover a back-side opening formed by the rear case 104, and is combined with the rear case 104. In an internal space of the housing 108 formed by combining the rear case 104 and the rear cover 106, a battery 116, etc. are housed.

In the parts holder 114 housed in the internal space of the housing 108, for example, as illustrated in FIG. 3, a flexible substrate 118 connected to the circuit board 112 via a connector 118a and the LED 120 mounted on the flexible substrate 118 are placed. Furthermore, the infrared sensor 122 mounted on the flexible substrate 118 to be adjacent to the LED 120 is placed in the parts holder 114. When there is an incoming call on the cellular phone 100, the LED 120 emits a visible wavelength range of light (hereinafter, referred to as "light of the LED 120"). In infrared communication of the cellular phone 100, the infrared sensor 122 emits and receives an infrared wavelength range of light (hereinafter, referred to as "light of the infrared sensor 122"). The LED 120 is an example of a first light-emitting source, and the infrared sensor 122 is an example of a second light-emitting source. Incidentally, in addition to these, various parts of the cellular phone 100, such as a receiver 124 and an in-camera 126, are placed in the parts holder 114.

A light guide plate unit 130 and a light-blocking member 140 are inserted between the parts holder 114 and the front case 102. The light guide plate unit 130 guides lights of the LED 120 and the infrared sensor 122 to the first and second holes 108a and 108b of the housing 108, respectively. Configurations of the light guide plate unit 130 and the light-blocking member 140 will be explained in detail below.

Figure 4:
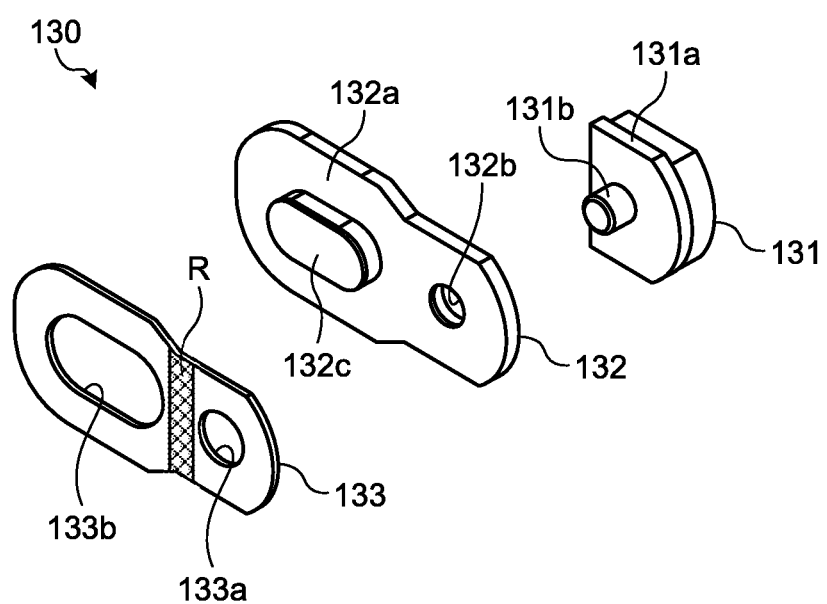
FIG. 4 is an exploded perspective view of a light guide plate unit of the cellular phone according to the present embodiment.
Figure 5:
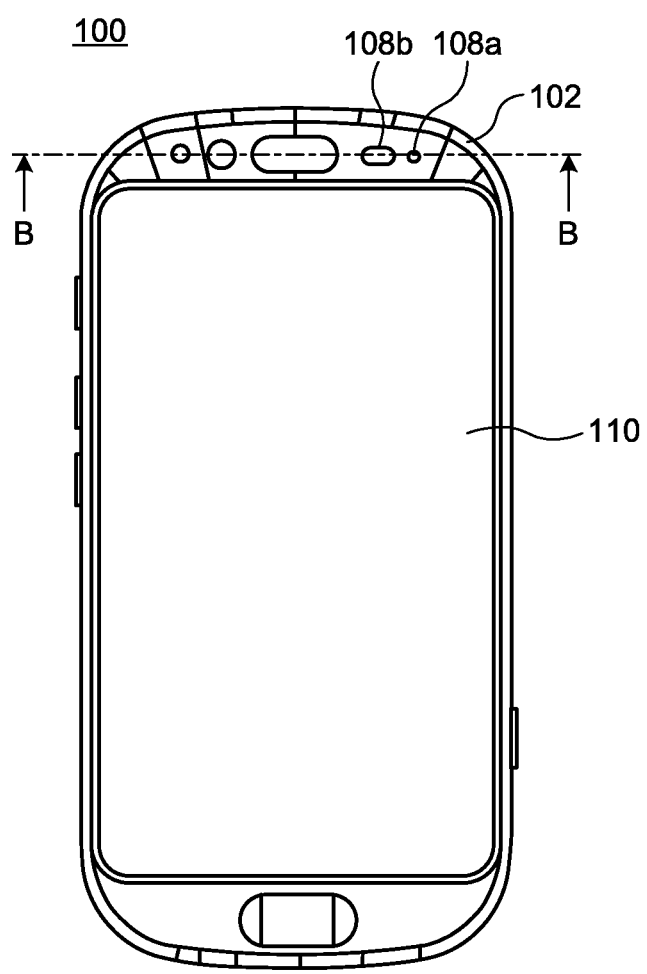
FIG. 5 is a plan view of the cellular phone according to the present embodiment.
Figure 6:
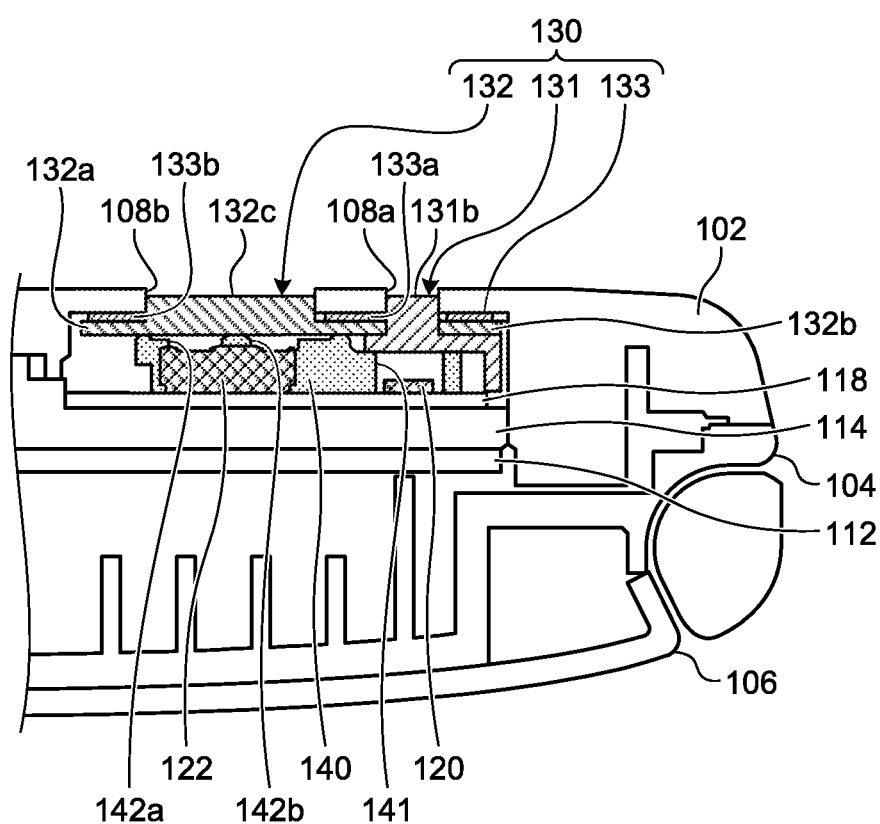
FIG. 6 is a cross-sectional view illustrating a part of a cross-section of the cellular phone along a line B-B illustrated in FIG. 5.

FIG. 4 is an exploded perspective view of the light guide plate unit of the cellular phone according to the present embodiment. FIG. 5 is a plan view of the cellular phone according to the present embodiment. FIG. 6 is a cross-sectional view illustrating a part of a cross-section of the cellular phone along a line B-B illustrated in FIG. 5. As illustrated in FIGS. 4 to 6, the light guide plate unit 130 is formed by stacking an LED light guide plate 131, an infrared-sensor light guide plate 132, and a double-sided tape 133 in this order.

The LED light guide plate 131 is made of light-transmissive resin with the wavelength range of light of the LED 120 as a passband, and has a main-body plate portion 131a that covers an upper surface of the LED 120. A projection 131b, which is circular in cross-section, is formed on the main-body plate portion 131a; the projection 131b projects in a direction toward the opposite side of the LED 120, and is to be inserted into the first hole 108a of the housing 108. The LED light guide plate 131 guides light of the LED 120 from the projection 131b to the first hole 108a of the housing 108. The LED light guide plate 131 is an example of a first light guide plate.

The infrared-sensor light guide plate 132 is made of light-transmissive resin with the wavelength range of light of the infrared sensor 122 as a passband, and has a main-body plate portion 132a that mainly covers an upper surface of the infrared sensor 122. A through-hole 132b through which the projection 131b of the LED light guide plate 131 penetrates is formed on the main-body plate portion 132a. The main-body plate portion 132a is superposed on the LED light guide plate 131 with the projection 131b of the LED light guide plate 131 penetrating through the through-hole 132b. In other words, the main-body plate portion 132a is superposed on the LED light guide plate 131 with the projection 131b of the LED light guide plate 131 penetrating through the through-hole 132b in a press-fitted state so as to seal a gap between the projection 131b of the LED light guide plate 131 and the edge of the first hole 108a of the housing 108. Furthermore, a projection 132c, which is elliptical in cross-section, is formed on the main-body plate portion 132a; the projection 132c projects in a direction toward the opposite side of the infrared sensor 122, and is to be inserted into the second hole 108b of the housing 108. The infrared-sensor light guide plate 132 guides light of the infrared sensor 122 from the projection 132c to the second hole 108b of the housing 108. The infrared-sensor light guide plate 132 is an example of a second light guide plate.

The passband of the infrared-sensor light guide plate 132 is set to be higher than that of the LED light guide plate 131. Consequently, when light of the LED 120 guided to the LED light guide plate 131, which is a visible wavelength range of light, has reached the infrared-sensor light guide plate 132, the light of the LED 120 is blocked out by the infrared-sensor light guide plate 132.

The double-sided tape 133 is inserted between the infrared-sensor light guide plate 132 and the housing 108 (the front case 102). The double-sided tape 133 attaches the main-body plate portion 132a of the infrared-sensor light guide plate 132 to the housing 108 (the front case 102). A through-hole 133a through which the projection 131b of the LED light guide plate 131 penetrating through the through-hole 132b of the infrared-sensor light guide plate 132 penetrates and a through-hole 133b through which the projection 132c of the infrared-sensor light guide plate 132 penetrates are formed on the double-sided tape 133. A region R of the double-sided tape 133 sandwiched between the through-hole 133a and the through-hole 133b is set according to a distance between the projection 131b of the LED light guide plate 131 penetrating through the through-hole 132b of the infrared-sensor light guide plate 132 and the projection 132c of the infrared-sensor light guide plate 132. In other words, the maximum area of the region R of the double-sided tape 133 is an area of a region sandwiched between the projection 131b of the LED light guide plate 131 penetrating through the through-hole 132b of the infrared-sensor light guide plate 132 and the projection 132c of the infrared-sensor light guide plate 132. Consequently, an attachment region of the double-sided tape 133 can be increased as large as possible. The double-sided tape 133 is an example of a first adhesive member.

Furthermore, as illustrated in FIGS. 3 and 6, the light-blocking member 140 is inserted between the LED light guide plate 131 and the infrared-sensor light guide plate 132 and between the LED 120 and the infrared sensor 122. The light-blocking member 140 blocks out light other than the light guided to the first hole 108a of the housing 108 by the LED light guide plate 131 and the light guided to the second hole 108b of the housing 108 by the infrared-sensor light guide plate 132. The light-blocking member 140 is made of an elastic member, such as a rubber material, and is formed into a box that covers the LED 120 and the infrared sensor 122. On a surface of the light-blocking member 140 facing the LED light guide plate 131, a light guide hole 141 for guiding light of the LED 120 to the LED light guide plate 131 is formed. On a surface of the light-blocking member 140 facing the infrared-sensor light guide plate 132, a light guide hole 142a for guiding light of the infrared sensor 122 to the infrared-sensor light guide plate 132 and a light guide hole 142b for guiding incident light from the infrared-sensor light guide plate 132 to the infrared sensor 122 are formed.

Subsequently, an assembly method of the cellular phone 100 according to the present embodiment is explained. The assembly method of the cellular phone 100 according to the present embodiment is as follows. First, the main-body plate portion 132a of the infrared-sensor light guide plate 132 is superposed on the LED light guide plate 131 with the projection 131b of the LED light guide plate 131 penetrating through the through-hole 132b of the main-body plate portion 132a of the infrared-sensor light guide plate 132. Then, the main-body plate portion 132a is attached to the housing 108 via the double-sided tape 133 so that the projection 131b of the LED light guide plate 131 and the projection 132c of the infrared-sensor light guide plate 132 are inserted into the first and second holes 108a and 108b of the housing 108, respectively. In this way, an assembled state of the cellular phone 100 illustrated in FIG. 6 is achieved.

As described above, in the cellular phone 100 according to the present embodiment, the main-body plate portion 132a of the infrared-sensor light guide plate 132 is superposed on the LED light guide plate 131 with the projection 131b of the LED light guide plate 131 penetrating through the through-hole 132b of the main-body plate portion 132a of the infrared-sensor light guide plate 132. Then, in the cellular phone 100, the main-body plate portion 132a of the infrared-sensor light guide plate 132 is attached to the housing 108 via the double-sided tape 133 inserted between the infrared-sensor light guide plate 132 and the housing 108. Accordingly, the maximum area of the region R of the double-sided tape 133 can be set to an area of a region sandwiched between the projection 131b of the LED light guide plate 131 penetrating through the through-hole 132b of the infrared-sensor light guide plate 132 and the projection 132c of the infrared-sensor light guide plate 132. Consequently, in the present embodiment, an attachment region of the double-sided tape 133 can be widened as compared with the conventional structure where the LED light guide plate and the infrared-sensor light guide plate are attached to the housing via the separate double-sided tapes. Therefore, in the present embodiment, it is possible to increase an attachment region of the double-sided tape 133 as large as possible and also possible to prevent the double-sided tape 133 from coming off from the infrared-sensor light guide plate 132 or the housing 108. As a result, according to the present embodiment, it is possible to maintain the light blocking effect while securing an attachment region of the double-sided tape 133 inserted between the light guide plate and the housing.

Furthermore, in the cellular phone 100 according to the present embodiment, the main-body plate portion 132a of the infrared-sensor light guide plate 132 is superposed on the LED light guide plate 131 so as to seal a gap between the projection 131b of the LED light guide plate 131 and the edge of the first hole 108a of the housing 108. As a result, according to the present embodiment, it is possible to prevent a leak of light from the gap between the projection 131b of the LED light guide plate 131 and the edge of the first hole 108a of the housing 108, and therefore it is possible to improve the light blocking effect.

Moreover, in the cellular phone 100 according to the present embodiment, the passband of the infrared-sensor light guide plate 132 is set to be higher than that of the LED light guide plate 131. Consequently, when light of the LED 120 guided to the LED light guide plate 131, which is a visible wavelength range of light, has reached the infrared-sensor light guide plate 132, the light of the LED 120 is blocked out by the infrared-sensor light guide plate 132. As a result, according to the present embodiment, the light blocking effect can be efficiently improved by a simple configuration.

Furthermore, in the cellular phone 100 according to the present embodiment, the light-blocking member 140 is inserted between the LED light guide plate 131 and the infrared-sensor light guide plate 132 and between the LED 120 and the infrared sensor 122. Then, in the cellular phone 100, the light-blocking member 140 blocks out light other than the light guided to the first hole 108a of the housing 108 by the LED light guide plate 131 and the light guided to the second hole 108b of the housing 108 by the infrared-sensor light guide plate 132. As a result, according to the present embodiment, it is possible to prevent a leak of unwanted light from the first hole 108a and the second hole 108b, and therefore it is possible to further improve the light blocking effect.

Variation

The embodiment is described above; however, besides the above-described embodiment, the present invention can be embodied in various different forms. In the following, various different embodiments are described as a variation.

Figure 7:
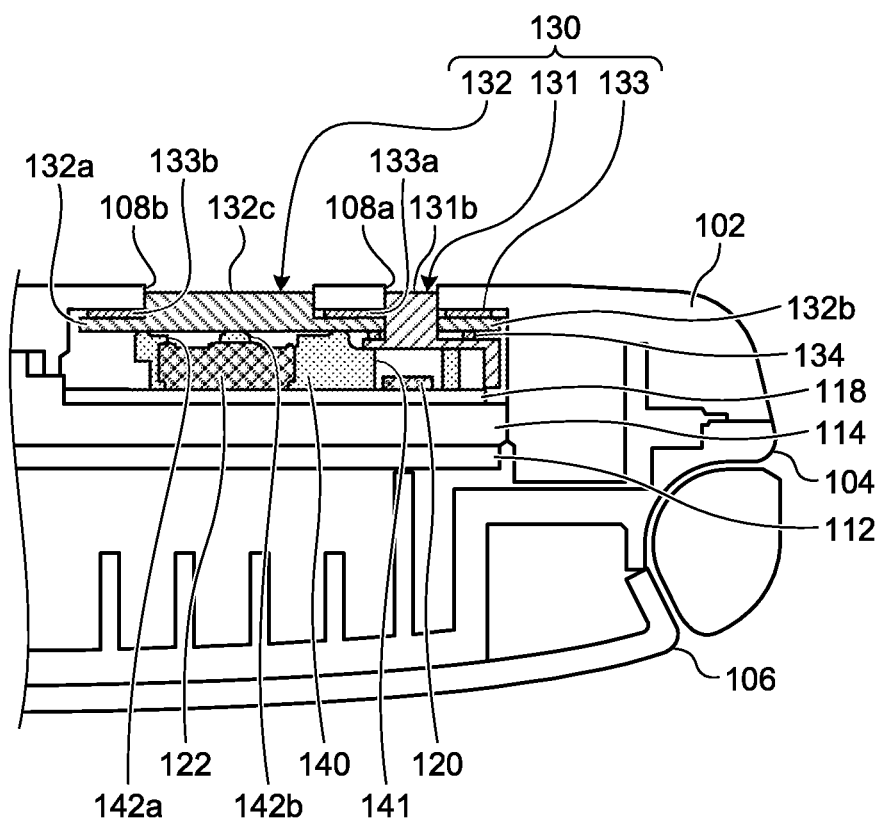
FIG. 7 is a cross-sectional view illustrating a part of a longitudinal cross-section of a cellular phone according to a variation.

For example, in the above embodiment, there is described an example where the main-body plate portion 132a of the infrared-sensor light guide plate 132 is superposed on the LED light guide plate 131 with the projection 131b of the LED light guide plate 131 penetrating through the through-hole 132b. However, the present embodiment is not limited to this. As in a cellular phone according to the variation of the present embodiment illustrated in FIG. 7, a double-sided tape 134 can be inserted between the LED light guide plate 131 and the infrared-sensor light guide plate 132. The double-sided tape 134 attaches the LED light guide plate 131 to the main-body plate portion 132a of the infrared-sensor light guide plate 132. The double-sided tape 134 is an example of a second adhesive member. Incidentally, FIG. 7 is a cross-sectional view illustrating a part of a longitudinal cross-section of the cellular phone according to the variation.

In the cellular phone according to the variation of the present embodiment, the LED light guide plate 131 is attached to the main-body plate portion 132a of the infrared-sensor light guide plate 132 via the double-sided tape 134 inserted between the LED light guide plate 131 and the infrared-sensor light guide plate 132. As a result, according to the variation of the present embodiment, it is possible to prevent a leak of light from a gap between the LED light guide plate 131 and the infrared-sensor light guide plate 132, and therefore it is possible to further improve the light blocking effect.

According to one aspect of an electronic device discussed in the present application, it is possible to maintain the light blocking effect while securing an attachment region of an adhesive member inserted between a light guide plate and a housing.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An electronic device comprising:
   a housing on which a first hole corresponding in position to a first light-emitting source and a second hole corresponding in position to a second light-emitting source are formed;
   a first light guide plate that has a first projection to be inserted into the first hole and guides light of the first light-emitting source from the first projection to the first hole;
   a second light guide plate that has a main-body plate portion to be superposed on the first light guide plate with the first projection penetrating therethrough and a second projection to be inserted into the second hole, and blocks out the light of the first light-emitting source with the main-body plate portion and guides light of the second light-emitting source from the second projection to the second hole; and
   a first adhesive member that is inserted between the second light guide plate and the housing and attaches the main-body plate portion to the housing, wherein
   a first through-hole through which the first projection penetrating through the main-body plate portion of the second light plate penetrates and a second through-hole through which the second projection penetrates are formed on the first adhesive member.

2. The electronic device according to claim 1, wherein the main-body plate portion is superposed on the first light guide plate so as to seal a gap between the first projection and an edge of the first hole.

3. The electronic device according to claim 1, wherein the first light guide plate has a passband corresponding to a wavelength range of the light of the first light-emitting source,
   the second light guide plate has a passband corresponding to a wavelength range of the light of the second light-emitting source, and
   the passband of the second light guide plate is higher frequency than the passband of the first light guide plate.

4. The electronic device according to claim 1, further comprising a light-blocking member that is inserted between a set of the first light guide plate and the second light guide plate and a set of the first light-emitting source and the second light-emitting source, and blocks out light other than the light guided to the first hole by the first light guide plate and the light guided to the second hole by the second light guide plate.

5. The electronic device according to claim 1, further comprising a second adhesive member that is inserted between the first light guide plate and the second light guide plate and attaches the first light guide plate to the main-body plate portion.

6. An assembly method of an electronic device including a housing on which a first hole corresponding in position to a first light-emitting source and a second hole corresponding in position to a second light-emitting source are formed; a first light guide plate that has a first projection to be inserted into the first hole and guides light of the first light-emitting source from the first projection to the first hole; a second light guide plate that has a main-body plate portion to be superposed on the first light guide plate with the first projection penetrating therethrough and a second projection to be inserted into the second hole, and blocks out the light of the first light-emitting source with the main-body plate portion and guides light of the second light-emitting source from the second projection to the second hole; and a first adhesive member that is inserted between the second light guide plate and the housing and attaches the main-body plate portion to the housing, the assembly method of the electronic device comprising:
   superposing the main-body plate portion on the first light guide plate with the first projection of the first light guide plate penetrating through the main-body plate portion of the second light guide plate; and
   attaching the main-body plate portion of the second light guide plate to the housing via the first adhesive member so that the first projection of the first light guide plate and the second projection of the second light guide plate are inserted into the first and second holes of the housing, respectively, wherein
   a first through-hole through which the first projection penetrating through the main-body plate portion of the second light plate penetrates and a second through-hole through which the second projection penetrates are formed on the first adhesive member.

* * * * *